US00RE39235E

(19) United States
(12) Reissued Patent
Shuler et al.

(10) Patent Number: US RE39,235 E
(45) Date of Reissued Patent: Aug. 15, 2006

(54) FREEZERLESS WALL HYDRANT FOR DELIVERY OF HOT OR COLD WATER THROUGH A SINGLE DISCHARGE CONDUIT

(75) Inventors: James F. Shuler, Colorado Springs, CO (US); Alfred F. Dickey, Colorado Springs, CO (US); William L. Carlson, Colorado Springs, CO (US)

(73) Assignee: WCM Industries, Inc., Colorado Springs, CO (US)

(21) Appl. No.: 10/180,394

(22) Filed: Jun. 26, 2002

Related U.S. Patent Documents

Reissue of:
(64) Patent No.: 6,206,039
Issued: Mar. 27, 2001
Appl. No.: 09/435,411
Filed: Nov. 8, 1999

(51) Int. Cl.
*E03B 65/20* (2006.01)

(52) U.S. Cl. ..... 137/606; 137/360; 137/375; 137/801

(58) Field of Classification Search ..... 137/801, 137/360, 375, 606, 614.2
See application file for complete search history.

(56) References Cited

U.S. PATENT DOCUMENTS 3,952,770 A * 4/1976 Botnick ..... 137/360
4,158,366 A * 6/1979 Meter ..... 137/312
4,316,481 A * 2/1982 Fillman ..... 137/360
4,700,732 A * 10/1987 Francisco
4,909,270 A * 3/1990 Enterante, Sr. et al.
5,029,603 A * 7/1991 Ackroyd ..... 137/218
5,590,679 A * 1/1997 Almasy et al.
5,632,303 A * 5/1997 Almasy et al.
5,752,542 A * 5/1998 Hoeptner, III ..... 137/218
6,206,039 B1 3/2001 Shuler et al.

OTHER PUBLICATIONS

Zurn Industries, Inc.; Hydromechanics Handbook; Aug. 1971; ; Erie, PA, USA.

Prier–Brass Manufacturing Co; H&C Mixture Yoke, Kansas City, Mo., USA, 1968.

* cited by examiner

*Primary Examiner*—A. Michael Chambers

(57) ABSTRACT

A freezeless wall hydrant for delivery of hot or cold water from a single discharge conduit has first and second fluid inlet pipes in parallel spaced relation. The pipes have forward and rearward ends and are connected respectively to sources of hot and cold pressurized water. A laterally extending fluid conduit member connects the forward ends of the first and second fluid inlet pipes and is in communication therewith. A fluid closure valve is located in the rearward ends of each of the first and second fluid pipes. A check valve is in each of the pipes forwardly of the fluid closure valves and is capable of permitting fluid flow in the pipes in a direction from the closure valve, but prevents fluid flow towards the closure valves. A valve rod having forward and rearward ends rotatably extends through the laterally extending fluid conduit and through the forward ends of the first and second inlet pipes and has one end operatively connected to the check valves in the rearward ends of the fluid inlet pipes. A handle is located on a protruding forward end of the valve rods to permit the manual movement of the rods to open or close the fluid closure valves. A fluid exit conduit has a rearward end in communication with the laterally extending fluid conduit and extends forwardly and downwardly and terminates in a hose threaded portion. A check valve is located in the fluid exit conduit to prevent fluid flow therein only towards the forward end of the fluid exit conduit.

4 Claims, 2 Drawing Sheets

FREEZERLESS WALL HYDRANT FOR DELIVERY OF HOT OR COLD WATER THROUGH A SINGLE DISCHARGE CONDUIT

Matter enclosed in heavy brackets [ ] appears in the original patent but forms no part of this reissue specification; matter printed in italics indicates the additions made by reissue.

BACKGROUND OF THE INVENTION

It is often desirable to have both hot and cold water available at a hydrant on the external wall of a structure or building. While many freezeless hydrants for mounting externally on a building have long been available, they are not designed to adaptation to both hot and cold water supplies.

It is therefore a principal object of this invention to provide a freezeless wall hydrant for delivery of hot or cold water through a single discharge conduit.

SUMMARY OF THE INVENTION

A freezeless wall hydrant for delivery of hot or cold water from a single discharge conduit has first and second fluid inlet pipes in parallel spaced relation. The pipes have forward and rearward ends and are connected respectively to sources of hot and cold pressurized water.

A laterally extending fluid conduit member connects the forward ends of the first and second fluid inlet pipes and is in communication therewith.

A fluid closure valve is located in the rearward ends of each of the first and second fluid pipes. A check valve is in each of the pipes forwardly of the fluid closure valves and is capable of permitting fluid flow in the pipes in a direction from the closure valve, but prevents fluid flow towards the closure valves.

A valve rod having forward and rearward ends rotatably extends through the laterally extending fluid conduit and through the forward ends of the first and second inlet pipes and has one end operatively connected to the check valves in the rearward ends of the fluid inlet pipes. A handle is located on a protruding forward end of the valve rods to permit the manual movement of the rods to open or close the fluid closure valves.

A fluid exit conduit has a rearward end in communication with the laterally extending fluid conduit and extends forwardly and downwardly and terminates in a hose threaded portion. A check valve is located in the fluid exit conduit to prevent fluid flow therein only towards the forward end of the fluid exit conduit.

DESCRIPTION OF THE PREFERRED EMBODIMENT

Figure 1:
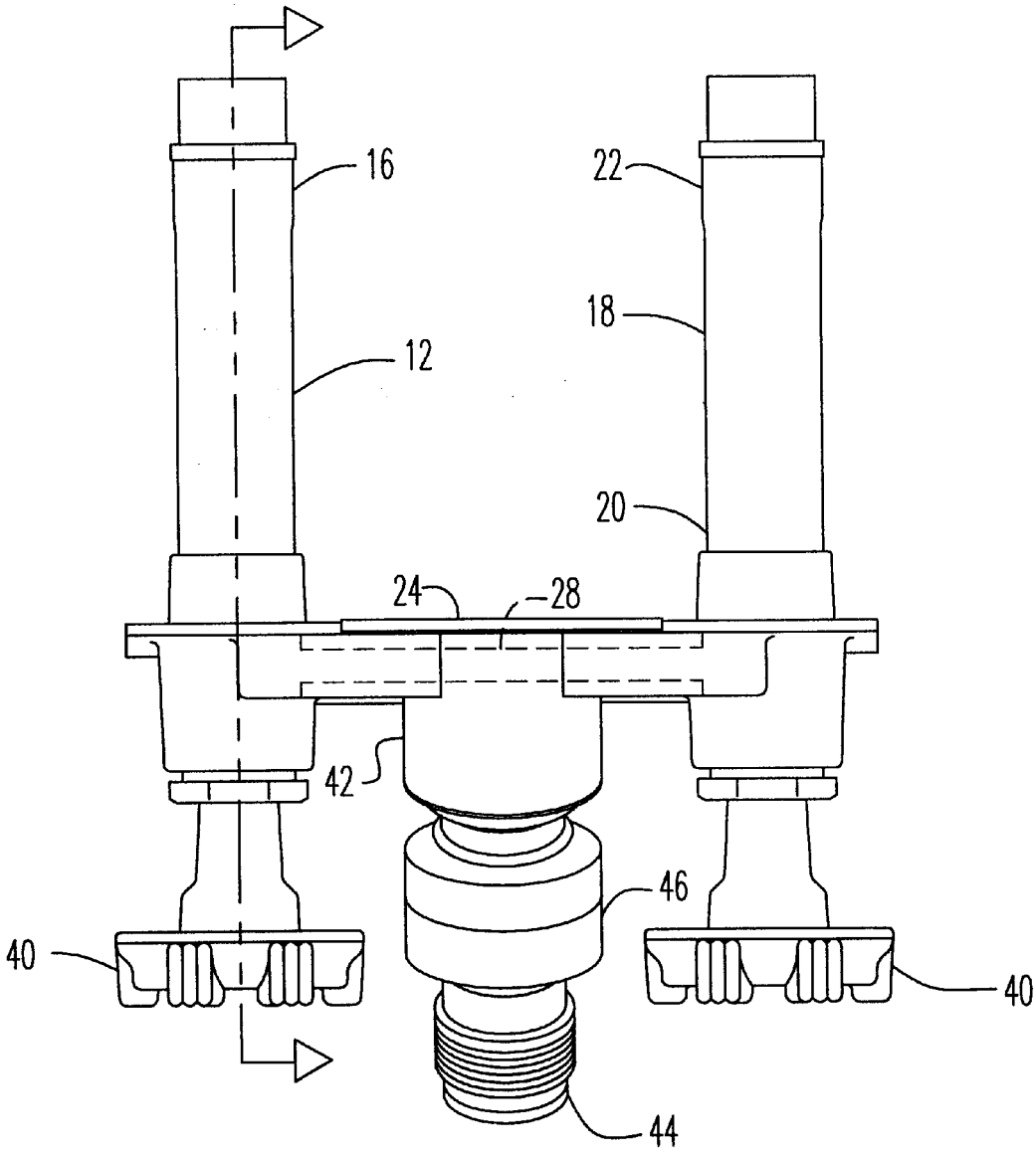
FIG. 1 is a plan view of the hydrant of this invention.
Figure 2:
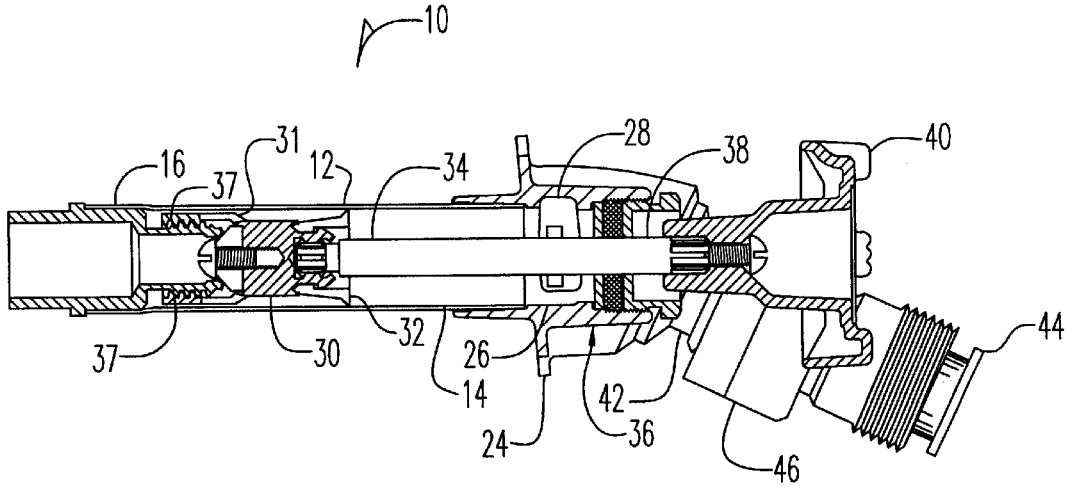
FIG. 2 is a sectional view taken on line 2—2 of FIG. 1.
Figure 3:
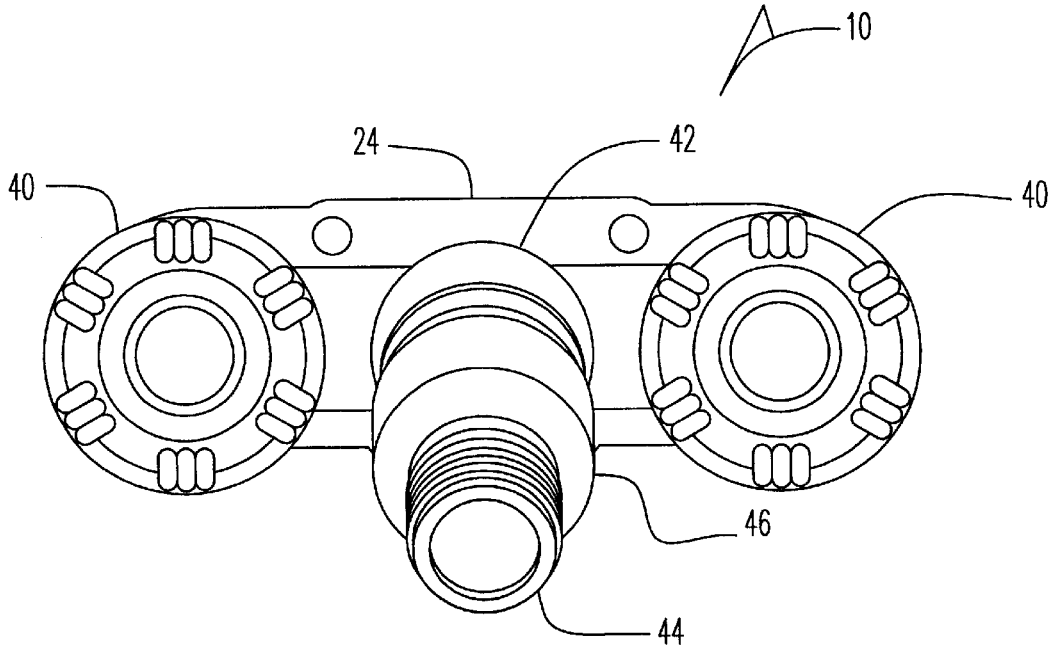
FIG. 3 is a front elevational view as seen from the bottom end of FIG. 1.

With reference to FIGS. 1 and 2, the hydrant 10 has a hot water inlet pipe 12 with a forward end 14 and a rearward end 16. A cold water pipe 18 has a forward end 20 and rearward end 22 and is disposed in parallel spaced relationship to pipe 12. The pipes 12 and 18 are connected to sources of hot and cold water, respectively, (not shown).

A mounting casting 24 has a pair of spaced apertures 26 therein and a laterally extending fluid conduit 28. The apertures 26 receive the forward end 14 of pipe 12 and the forward end 20 of pipe 18 and are in sealed connection with the outside surfaces of the respective pipes. The laterally extending fluid conduit 28 is in fluid communication with the interiors of both of the pipes 12 and 18. Fluid closure valves 30 are located in the rearward ends of each of the pipes 12 and 18, and each valve includes a conventional valve seat 31. A conventional check valve 32 is located on the forward end of each of the fluid closure valves 30 and is made in accordance with U.S. Pat. Nos. 5,590,679 and 5,632,303 which are incorporated herein by reference.

An elongated valve rod 34 extends through the apertures 26 in mounting casting 24 and thence extends into each of the pipes 12 and 18. The rods 34 also slidably extend through the packing assemblies 36 which are mounted in the apertures 26 of mounting casting 24 to seal the apertures 26 against fluid flow. The valve rod 34 is longitudinally movable in the pipes 12 and 18 by means of the conventional threaded assembly generally shown by the numeral 37 in FIG. 2. The numeral 38 designates the protruding forward ends of the rods 34 to which is secured a conventional wheel handle 40.

A fluid exit conduit 42 extends downwardly and forwardly from the mounting casting 24 and is in fluid communication with the laterally extending fluid conduit 28 within casting 24. The conduit 42 terminates in a conventional hose-threaded nozzle end 44. A conventional check valve 46 is located within fluid exit conduit 42 to permit fluid flow in the conduit only in a direction towards the nozzle end 44. Similarly, the check valves 32 permit the flow of fluid in pipes 12 and 18 only in a direction away from the closure valves 30 and not in a direction towards the closure valves. Thus, a continuous fluid chamber exists in the hydrant 10 and extends from each of the check valves 32 forwardly through the pipes 12 and 18, and thence across the laterally extending fluid conduit 28, and thence through the fluid exit conduit 42. Because the conduit 42 extends forwardly and downwardly from casting 24, any residual fluid in the above described fluid department will move by gravity and will exit through nozzle end 44 of the conduit 42.

In operation, both of the fluid closure valves 30 are normally closed to prevent flow of any incoming fluid, hot or cold, through the inlet pipes 12 and 18. When hot water is needed at the nozzle end 44, the wheel handle 40 is rotated in a counter clockwise direction to cause the rod 34, through the threaded assembly 37 to cause the fluid closure valve 30 to remove itself from valve seat 31, thus permitting hot water to flow into the inlet pipe 12. The hot water flows thence through the laterally extending fluid conduit 28 and thence outwardly through fluid exit conduit 42 and nozzle end 44. The hot water may continue to move through the laterally extending fluid conduit 28, but it will not move into the source of cold water supply connected to pipe 18 because its movement towards the cold water supply will be precluded by the check valve 32 in pipe 18.

The same phenomenon described above would also exist in reverse form when the closure valve 30 in pipe 18 is opened and the closure valve 30 in pipe 12 is closed.

It is also possible to have both closure valves 30 in both inlet pipes 12 and 18 open at the same time to blend hot and cold water within the composite fluid compartment downstream from each of the check valves 32. Obviously, the check valves 32 prevent cold water from moving towards the hot water source, and vice versa.

Conventionally, no water exterior of nozzle end 44 is permitted to enter the hydrant 10 by reason of the conventional check valve 46. Residual water in any of the conduits will flow by gravity out of nozzle end 44 of conduit 42.

Therefore it is seen that this invention achieves all of its stated objectives.

What is claimed is:

1. A freezeless wall hydrant for delivery of hot or cold water from a single discharge conduit, comprising, elongated first and second fluid inlet pipes in parallel spaced relation and having forward and rearward ends, a laterally extending fluid conduit member between and adjacent to the forward ends of the first and second fluid inlet pipes, and being in fluid communication therewith, a fluid closure valve in the rearward ends of the first and second fluid inlet pipes, a check valve in each of the first and second fluid inlet pipes forwardly of the fluid closure valves and being capable of permitting fluid flow in the pipes in a direction from the closure valve, but preventing fluid flow towards the closure valve, a valve rod having a forward end rotatably extending through the laterally extending fluid conduit and thence through forward ends of the first and second fluid inlet pipes and being operatively connected to the check valves in the rearward end of the fluid inlet pipes, a handle in a protruding forward end of the valve rods to permit the manual movement of the rods to open or close the fluid closure valves, a fluid exit conduit having a rearward end in connection with the laterally extending fluid conduit, and a forward end terminating in a hose threaded portion, a check valve in the fluid exit conduit to permit fluid flow therein only towards the formed end of the fluid exit conduit, the rearward ends of the first and second fluid pipes being connected to sources of hot and cold water, respectively rearwardly of the fluid closure valves.

2. The device of claim 1 wherein the fluid exit conduit extends downwardly and forwardly from the laterally extending fluid conduit.

*3. A freezeless wall hydrant for delivery of hot or cold water from a single discharge conduit, comprising,*

*elongated first and second fluid inlet pipes in parallel spaced relation and having forward and rearward ends,*

*a laterally extending fluid conduit member between and adjacent to the forward ends of the first and second fluid inlet pipes, and being in fluid communication therewith,*

*a fluid closure valve in the rearward ends of the first and second fluid inlet pipes,*

*a check valve in one of fluid inlet pipes forwardly of the fluid closure valves and being capable of permitting fluid flow in the pipes in a direction from the closure valve, but preventing fluid flow towards the closure valve,*

*a valve rod having a forward end rotatably extending through the laterally extending fluid conduit and thence through forward ends of the first and second fluid inlet pipes,*

*a handle in a protruding forward end of the valve rods to permit the manual movement of the rods to open or close the fluid closure valves,*

*a fluid exit conduit having a rearward end in connection with the laterally extending fluid conduit, and a forward end terminating in a hose threaded portion,*

*a check valve in the fluid exit conduit to permit fluid flow therein only towards the formed end of the fluid exit conduit,*

*the rearward ends of the first and second fluid pipes being connected to sources of hot and cold water, respectively rearwardly of the fluid closure valves.*

*4. A freezeless wall hydrant for delivery of hot or cold water from a single discharge conduit, comprising,*

*elongated first and second fluid inlet pipes in parallel spaced relation and having forward and rearward ends,*

*a laterally extending fluid conduit member between and adjacent to the forward ends of the first and second fluid inlet pipes, and being in fluid communication therewith,*

*a fluid closure valve in the rearward ends of the first and second fluid inlet pipes,*

*a valve rod having a forward end rotatably extending through the laterally extending fluid conduit and thence through forward ends of the first and second fluid inlet pipes,*

*a handle in a protruding forward end of the valve rods to permit the manual movement of the rods to open or close the fluid closure valves,*

*a fluid exit conduit having a rearward end in connection with the laterally extending fluid conduit, and a forward end terminating in a hose threaded portion,*

*a check valve in the fluid exit conduit to permit fluid flow therein only towards the formed end of the fluid exit conduit,*

*the rearward ends of the first and second fluid pipes being connected to sources of hot and cold water, respectively rearwardly of the fluid closure valves.*

* * * * *